US012723878B2

(12) United States Patent
Keidel et al.

(10) Patent No.: US 12,723,878 B2
(45) Date of Patent: Sep. 1, 2026

(54) VEHICLE, APPARATUS, COMPUTER PROGRAM AND METHOD FOR AT LEAST PARTIALLY COMPENSATING FOR AN OBSERVATION ERROR WHEN ESTIMATING THE COURSE OF A ROAD

(71) Applicant: Bayerische Motoren Werke Aktiengesellschaft, Munich (DE)

(72) Inventors: Frank Keidel, Poing (DE); Alexander Born, Munich (DE); Tilman Nowak, Erfurt (DE); Sean Brown, Deggendorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 48 days.

(21) Appl. No.: 18/573,491

(22) PCT Filed: Jun. 20, 2022

(86) PCT No.: PCT/EP2022/066707
§ 371 (c)(1),
(2) Date: Dec. 22, 2023

(87) PCT Pub. No.: WO2022/268703
PCT Pub. Date: Dec. 29, 2022

(65) Prior Publication Data

US 2024/0318963 A1 Sep. 26, 2024

(30) Foreign Application Priority Data

Jun. 23, 2021 (DE) ..................... 10 2021 116 286.6

(51) Int. Cl.
*G01C 21/30* (2006.01)
*G06V 20/56* (2022.01)

(52) U.S. Cl.
CPC ........... *G01C 21/30* (2013.01); *G06V 20/588* (2022.01)

(58) Field of Classification Search
CPC .............................. G01C 21/30; G06V 20/588
(Continued)

(56) References Cited

U.S. PATENT DOCUMENTS

2011/0295548 A1* 12/2011 Takabayashi ......... G01S 13/931 702/150
2012/0253596 A1* 10/2012 Ibrahim ............... G06V 20/584 348/46
(Continued)

FOREIGN PATENT DOCUMENTS

CN 111241224 A 6/2020
CN 111492202 A 8/2020
(Continued)

OTHER PUBLICATIONS

International Search Report (PCT/ISA/210) issued in PCT Application No. PCT/EP2022/066707 dated Sep. 28, 2022 with English translation (4 pages).
(Continued)

*Primary Examiner* — Mahmoud S Ismail
(74) *Attorney, Agent, or Firm* — Crowell & Moring LLP

(57) ABSTRACT

Systems, methods, and apparatus are provided for compensating for an observation error when estimating a course of a road in an environment of a vehicle. A state function is obtained for mapping the estimated course of the road. Environment measurement data of the environment of the vehicle is obtained. Information about the observation error is captured. A transform is determined by transforming the state function or the environment measurement data based on the captured information about the observation error to
(Continued)

compensate for the observation error. The estimated course of the road is adapted using the transform.

12 Claims, 10 Drawing Sheets

(58) Field of Classification Search
USPC .......................................................... 701/446
See application file for complete search history.

(56) References Cited

U.S. PATENT DOCUMENTS

| | | | |
|---|---|---|---|
| 2022/0101637 A1 | 3/2022 | Keidel et al. | |
| 2022/0169280 A1 | 6/2022 | Brown et al. | |
| 2022/0274644 A1* | 9/2022 | Johansson ....... | B60W 30/18036 |
| 2023/0419689 A1* | 12/2023 | Chundrlik, Jr. ........ | G08G 1/166 |

FOREIGN PATENT DOCUMENTS

| | | |
|---|---|---|
| CN | 111532257 A | 8/2020 |
| CN | 111923905 A | 11/2020 |
| DE | 10 2018 131 692 A1 | 6/2020 |
| DE | 10 2019 102 922 A1 | 8/2020 |
| DE | 10 2019 112 413 A1 | 11/2020 |
| DE | 10 2019 132 150 A1 | 5/2021 |

OTHER PUBLICATIONS

German-language Written Opinion (PCT/ISA/237) issued in PCT Application No. PCT/EP2022/066707 dated Sep. 28, 2022 with English translation (9 pages).

German Search Report issued in German Application No. 10 2021 116 286.6 dated Mar. 7, 2022 with partial English translation (12 pages).

Search Report with English translation, dated May 8, 2026 (6 pages).

Chinese-language Office Action issued in Chinese Application No. 2022800417879, dated May 10, 2026, with English translation (7 pages).

Zui Tao et al., "Road Invariant Extended Kalman Filter for an Enhanced Estimation of GPS Errors Using Lane Markings", IEEE/RSJ International Conference on Intelligent Robots and Systems (2015), dated Oct. 8, 2015, pp. 3119-3124 (7 pages).

* cited by examiner 317
302
δ
γ
γ
318
316
314
332
343
310
342
341
352

VEHICLE, APPARATUS, COMPUTER PROGRAM AND METHOD FOR AT LEAST PARTIALLY COMPENSATING FOR AN OBSERVATION ERROR WHEN ESTIMATING THE COURSE OF A ROAD

BACKGROUND AND SUMMARY

The present subject matter relates to a vehicle, an apparatus, a computer program and a method for at least partially compensating for an observation error when estimating the course of a road. In particular, examples relate to a concept for estimating the course of a road for a vehicle controlled in an at least partially automated manner.

The control of some (partially) automated or autonomously driving vehicles involves the use of concepts for estimating the course of the road which are taken as a basis to enable driving decisions to be made by the controller of such a vehicle.

In this case, the course of the road can be approximately described by determining a road model corresponding to the state function. The course of the road can thereby be ascertained in particular relative to a position and/or an orientation of the vehicle. Properties of the course of the road may be for example width, direction, curvature or number of mutually adjacent lanes or the position of the vehicle in relation to the lanes (for example the vehicle is located in the right, middle or left lane of three lanes).

The vehicle can then be controlled in such a way that it follows the course of the road, avoids obstacles or changes lane, for example. The state function underlying that can be generated and adapted on the basis of observations of the environment. By way of example, camera systems are used for the observations. It has been found in practice that the observations, as explained in greater detail later, may be beset by angle errors of systematic origin and/or perspective angle errors and/or other observation errors, such as an erroneous observation of a road curvature or an erroneously observed lateral offset, for example. On account of that, the resulting state function may deviate from the actual course of the road, which may in turn result in problems for the (partially) automated control.

There is therefore a need for an improved concept for estimating the course of a road.

This need can be met by the independent and dependent claims of the present disclosure.

Examples of the present subject matter are based on the insight that it is possible to take account of observation errors for the purpose of the at least partial compensation thereof and/or the effects thereof on the estimation of the course of the road when generating and adapting the estimated course of the road, in order that the road estimation corresponding to the state function has a higher accuracy for the benefit of better driving behavior of a (partially) automated vehicle. In practice, generating and adapting the estimated course of the road is based for example on a comparison of a prediction of the state function with observations, in particular environment measurement data, of the environment. Approaches for compensating for the observation error according to the present concept accordingly propose for example transforming the state function and/or the environment measurement data on the basis of the observation error in such a way as to reduce effects of the observation error when comparing the state function with the environment measurement data. Approaches for compensating for an angle error provide for example for “rotating” the state function and/or the environment measurement data on the basis of the angle error (within the coordinate system thereof). As explained in greater detail later, the observation error can be ascertained in particular on the basis of a comparison of the environment measurement data with movement data of the vehicle.

Examples of the present subject matter provide a method for at least partially compensating for an observation error when estimating a road course of a road in the environment of a vehicle. A suitable vehicle here is any ground-based vehicle. In examples, the vehicle is a vehicle which is controlled in a partially or fully automated manner and which may be designed to make driving decisions in an automated manner on the basis of the estimated course of the road.

The method comprises obtaining at least one state function for mapping the estimated course of the road. The state function approximately maps the course of a road boundary or of an imaginary line along the road, for example. For the purpose of approximately mapping the road boundary, or the course, the state function maps for example the course of outer road markings or of an imaginary central line of the road. Any traffic space can be understood in the context of the present disclosure. In practice, the road can comprise a roadway 101 or one or more lanes of a roadway. However, the road can also comprise other traffic spaces, such as a place to park or a breakdown lane, for example.

In examples, the state function describes the position, orientation and/or shape of the road. For the purpose of mapping the road, the state function comprises one or more functions. By way of example, a spline having one or more functions, preferably polynomial or clothoid functions, is used for the state function. In examples, the state function is usually adapted to observations of the environment by means of an approximation method. For the purpose of continuous road estimation, in practice it is possible to apply a recursive method, in particular a Bayes filter, such as a Kalman filter or a particle filter, for example, by means of which the state function is adapted continuously (iteratively) on the basis of observations of the environment. In this case, the state function can be regarded as a state of a Kalman filter or of a particle filter. Optionally, any other approximation methods can also be applied.

The method proposed herein furthermore comprises obtaining environment measurement data of the environment of the vehicle. The environment measurement data can be or comprise sensor data, image information or data derived therefrom from the observation of the environment (vehicle environment) of the vehicle. In practice, the environment measurement data correspond to a polynomial function which is approximated to image information or sensor data. For the best possible compromise concerning accuracy and computational efficiency, a third degree polynomial function is used in examples. The polynomial function approximately describes for example a course of road markings captured in a sensor-based manner. The environment measurement data may be beset by the observation error on account of the perspective during the observation and/or on account of systematic errors (bias) during the sensor-based capture of the environment measurement data. The observation error comprises for example an angle error (incorrectly/erroneously observed angle relative to the coordinate system of the vehicle), a curvature error (incorrectly/erroneously observed curvature of the road) and/or an offset error (incorrectly/erroneously observed positioning of the road, in particular in a translational direction).

Furthermore, the method comprises capturing information about the observation error. By way of example, an observation error that is expected or ascertained by the manufacturer is used for this purpose. As explained in greater detail later, optionally for the purpose of capturing the information about the observation error, the environment measurement data can be compared with map data of the environment or reference data of other sensors. Optionally, for this purpose, environment measurement data measured successively over time can also be compared with one another.

Furthermore, the method comprises determining a transform by transforming at least one of the state function or the environment measurement data on the basis of the captured information about the observation error for the purpose of at least partially compensating for the observation error, and adapting the estimated course of the road using the transform. In known concepts, the state function for the purpose of estimating the course of the road is adapted on the basis of a comparison with the environment measurement data. This can be done by firstly transforming the environment measurement data and/or the state function into a common coordinate system. If the environment measurement data have an observation error, the latter may have a concomitant influence to the detriment of accuracy in the estimation of the course of the road. In the present case, therefore, it is proposed to transform the state function and/or the environment measurement data on the basis of the observation error in such a way that the observation error is at least partially compensated for. For this purpose, the environment measurement data, the state function or both the environment measurement data and the state function can be rotated, displaced and/or distorted on the basis of the information about the observation error. In the context of the present disclosure, the transform can thus be both the transformed state function and the transformed environment measurement data. The transforming has the effect of achieving an at least partial compensation of the observation error and thus increasing the accuracy of the estimation by way of the adapted state function. The vehicle can then use the adapted state function in order to control the vehicle in an (partially) automated manner. The vehicle can carry out steering, acceleration or braking maneuvers or the like on the basis of the state function, for example.

In examples, capturing information about the observation error can comprise determining a deviation of the environment measurement data from the course of the road and obtaining the information about the observation error on the basis of the deviation. This can yield an up-to-date and more accurate estimation of the observation error.

In examples, the information about the observation error can comprise an error angle, and determining the transform can comprise rotating the state function or the environment measurement data on the basis of the error angle. By way of example, the application of a rotation matrix is provided for the purpose of rotating the state function or the environment measurement data.

Preferably, the rotating comprises rotating using a Bayes filter for estimating the course of the road and a rotation parameter of the Bayes filter that is based on the error angle. The Bayes filter is for example a Kalman filter and the rotation parameter is for example an additional parameter for representing the state function in the Bayes filter, or Kalman filter.

In some examples, capturing the information about the observation error comprises capturing movement measurement data of the vehicle and determining the information about the observation error on the basis of the environment measurement data and the movement measurement data. The movement measurement data comprise for example odometry data or GPS data of the vehicle. As will be understood by a person skilled in the art, it is possible to determine the movement measurement data as reference data for a comparison with the environment measurement data for the purpose of determining a deviation of the environment measurement data from the movement measurement data and for the purpose of determining the information about the observation error on the basis of the deviation from the movement measurement data. Determining the deviation is carried out for example while the vehicle is traveling. In practice, for example, a repeated (online) determination of the deviation is provided.

The environment measurement data can be measured iteratively. In this regard, the environment measurement data can comprise first environment measurement data measured at a first point in time and second environment measurement data measured at a later second point in time. Determining the information about the observation error then comprises for example transforming the first and second environment measurement data into a common coordinate system using the movement measurement data and determining the information about the observation error on the basis of a deviation between the first and second environment measurement data in the common coordinate system. The information about the observation error is determined for example on the basis of an observation-error-indicating distance or angle between the first and second environment measurement data in the common coordinate system.

For this purpose, in examples, determining the deviation between the first and second environment measurement data provides for determining the deviation on the basis of a deviation of a first measurement point of the first environment measurement data and a second measurement point of the second environment measurement data, which (the first and second measurement points) map the same point in the environment. The underlying idea here is that points of the first environment measurement data and of the second environment measurement data which map the same point in the environment would ideally lie one on top of another if no observation error were present. Accordingly, the observation error can be deduced from the deviation of the measurement points.

In practice, different observation errors can occur in each case during the observation of the left and right road boundaries on account of different perspectives. The proposed method can therefore be applied separately to each of the left and right road boundaries.

In this case, capturing the information about the observation error can comprise capturing first information about an observation error at the left road boundary and second information about the observation error at the right road boundary.

Furthermore, determining a transform can comprise determining a transform by transforming the environment measurement data and/or the state function for the purpose of at least partially compensating for the observation error at the left road boundary on the basis of the first and second information.

As a result, for the benefit of a better estimation of the course of the road, the observation error can be (at least partially) compensated for separately for the left and right road boundaries.

The respective observation error for the right and left road boundaries stems from changes in inclination, for example. Accordingly, capturing the first and second information can comprise obtaining information about changes in the inclination of the road and determining the first and second information on the basis of information about changes in the inclination of the road. The information about changes in inclination can be taken from position measurements and/or a (height) map of the environment, for example.

Other examples of the present subject matter provide a computer program, comprising instructions which, when the program is executed by a computer, cause the latter to carry out an example of the method proposed herein.

Further examples provide an apparatus comprising one or more interfaces for communication and a data processing circuit designed to control the one or more interfaces and to carry out an example of the method proposed herein using the one or more interfaces.

Still further examples provide a vehicle comprising an examples of the apparatus proposed herein.

DETAILED DESCRIPTION OF THE DRAWINGS

Various examples will now be described more thoroughly with reference to the accompanying drawings, in which some examples are illustrated. In the figures, the thickness dimensions of lines, layers and/or regions may be illustrated in an exaggerated manner for the sake of clarity.

In the field of concepts for autonomous driving, estimating the environment and the course of the road may be of great importance for the control of autonomously driving vehicles, for example. In this regard, by way of example, the vehicle can be controlled in such a way that it controls steering, acceleration, speed and further vehicle or driving parameters autonomously, without the assistance of a driver, such that the vehicle safely follows the estimated course of the road and/or can avoid obstacles, for example.

FIG. 1 shows an exemplary procedure for the sensor- or camera-based estimation of the course of a road.

Figure 1A:
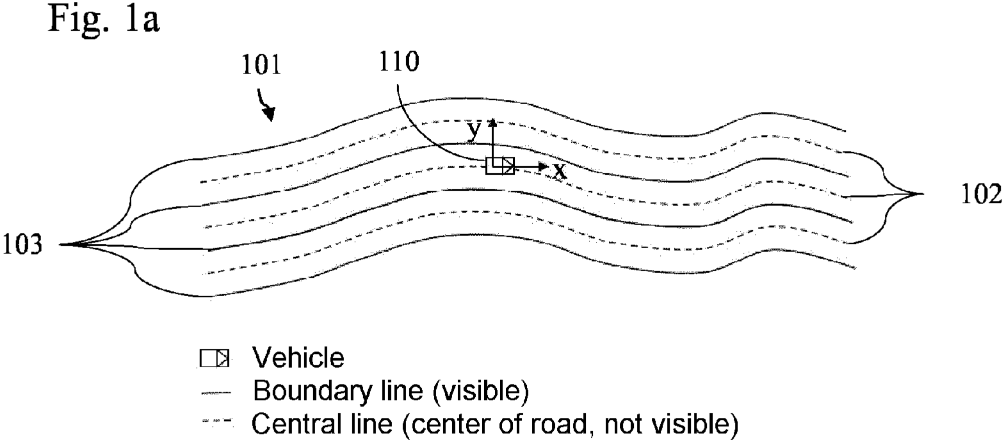
FIGS. 1*a*-1*e* show a procedure for estimating the course of a road.

In particular, FIG. 1*a* schematically shows a situation in which an (partially) autonomously driving vehicle 110 is located and/or moving on a roadway having three mutually adjacent lanes 102, which are each separated from one another by road boundaries, for example by guardrails or, as in the present case, by road markings 103. In the example shown, the vehicle 110 is located in the middle lane of the lanes 102.

Figure 1B:
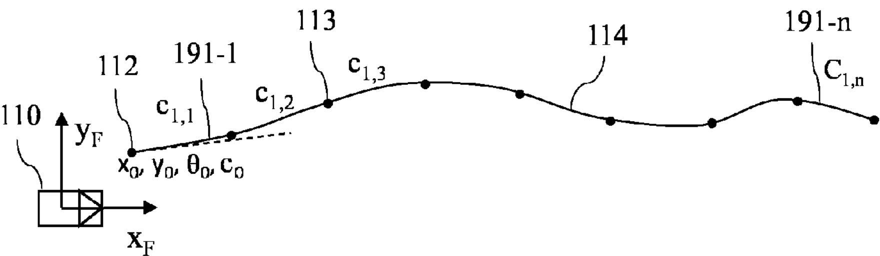
Figure 1C:
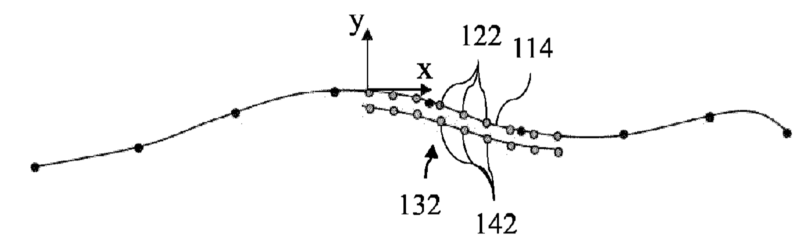

As illustrated in FIG. 1*b*, the vehicle 110 can firstly assume a state for the course of the road. For this purpose, the vehicle 110 firstly describes the course of the road by way of a state function 114 comprising a plurality of segments 191-1 to 191-*n*. The segments can be described by arbitrary functions. Preferably, for the segments, for the benefit of a simple representation and the best possible approximation of the course of the road, use is made of clothoid functions for the segments. The individual segments can be completely characterized by the parameters $c_0$, $c_{1,n}$, $\theta_0$ and $y_0$, where $c_0$ indicates an initial curvature, $c_{1,n}$ indicates a curvature course, $\theta_0$ indicates an orientation, and $y_0$ indicates a y-axis section of the respective segment. For the state function, which in the present case can also be understood as a clothoid spline having $n(n \in N)$ clothoid segments, that would mean that the clothoid spline can be described by $4 \cdot n$ parameters. The clothoid spline shown in FIG. 1*b* satisfies connection conditions between the clothoid segments which may reduce a number of the parameters necessary for describing the clothoid spline, thus resulting in a reduction of the calculation complexity for determining the clothoid spline. The clothoid spline is differentiable continuously at the transition points, for example, and the curvature values of two successive clothoid segments are equivalent at the transition points 113. Under the connection conditions mentioned, the number of the parameters necessary for describing the clothoid spline can be reduced to n+3. Therefore, the clothoid spline with reference point 112 $x_0$, $y_0$, initial curvature $c_0$ and orientation $\theta_0$ of the segment 191-1 can be completely characterized by a reduced parameter set ($c_0$, $\theta_0$, $y_0$, $x_0$ and $c_{1,1} \ldots c_{1,n}$). The state function 114 maps for example the course of a road marking, in the present case for example the left road marking of the lane in which the vehicle 110 is located.

For the purpose of approximately estimating the course of the road, in the present case provision is made for adapting the state function 114 on the basis of observations. For this purpose, the vehicle 110 is equipped with a camera system or sensor system, for example, which is designed to capture the road markings in a sensor-based manner and to supply environment measurement data that at least approximately map the course of the road marking. In the present case, the environment measurement data comprise for example a polynomial function 132 derived from recordings of the camera system or sensor system. Optionally, functions other than the polynomial function can also be used. In examples, for example, provision is made for then approximating the state function 114 to the environment measurement data by means of an approximation method. In this case, a sampling method can be applied in which the state function 114 is adapted in such a way that a distance between sample points 122 of the state function and sample points 142 of the environment measurement data is reduced. The adapted state function obtained can subsequently be used to control the vehicle 110. This procedure can be repeated iteratively and/or recursively during driving for a constantly updated estimation of the course of the road. In examples, for example, a Kalman filter or some other Bayes filter is used for estimating the course of the road.

In this sampling method, the adaptation of the state function to the observation data is effected for example by a deviation between mutually corresponding sampling points on the state function 114 and the environment measurement data 132 being ascertained, and by the Bayes filter (e.g. Kalman filter) minimizing or at least reducing the (square) deviation of the sampling points by adapting parameters of the state function 114.

One disadvantage of this method, however, is that for the purpose of adapting the parameters, in some examples, only the position (x and/or y values) of the sample points are used, while information about a progression of the environment measurement data between the sample points 142 is disregarded. As a result, it may happen that although the (square) deviation between the sampling points is minimized or at least reduced, a shape of the adapted state function does not match the shape of the environment measurement data 132. This effect is particularly severe if only a few sampling points are present. That may be the case, for example, if the environment measurement data 132 (camera polynomials) are very short (e.g. on account of a small visual range of the camera if a vehicle ahead conceals the road markings).

Figure 1D:
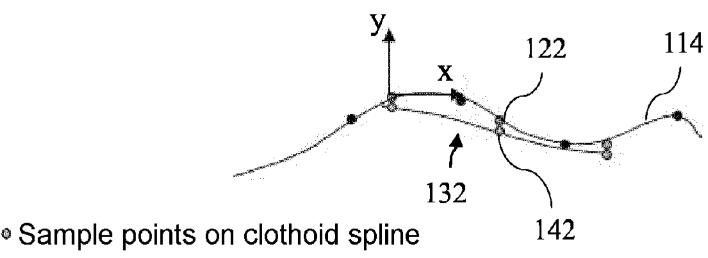

As shown in FIG. 1*d*, distances between the sampling points 122 on the state function 114 and the observation data are relatively small, but curvature and tangential angles on the two curves 114 and 132 near the origin (position of the vehicle) deviate greatly from one another. This may lead to inaccuracies in the estimation of the road, whereby the automated control may be restricted.

It is therefore proposed to take account of the curvature and/or the tangential angle to the sampling points 122 when adapting the state function 114 to the environment measurement data 132. As a result, the state function 114 can be adapted to the environment measurement data 132 more accurately.

Figure 1E:
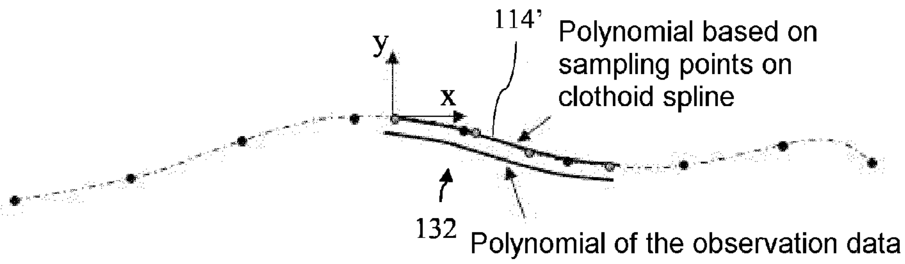

As shown in FIG. 1*e*, other approximation methods can also be applied as an alternative to sampling methods. In this case, for example, in the event of a transformation of the state function into the measurement space, a polynomial 114' can be generated which approximately corresponds (e.g. by means of polynomial fitting) to the state function 114 (clothoid spline). In this case, the polynomial 114' has the same degree (same number of polynomial coefficients) as the polynomial of the environment measurement data 132.

For the purpose of generating the polynomial 114' from the state function 114, for example 4 or some other number of points of the state function 114 can be sampled and corresponding polynomial coefficients of the polynomial 114' can be calculated by means of a linear equation system based on the points (for example with the aid of a Vandermonde matrix).

Parameters of the state function 114 can subsequently be adapted in such a way that a (square) distance (difference) between the coefficients of the polynomial of the environment measurement data 132 and the polynomial 114 ascertained from the state function 114 is minimized or at least reduced.

In practice, camera and sensor systems are beset by errors as provided by the manufacturer with the result that observations by means of these systems deviate from reality by a certain amount, an observation error. This may be caused by aging effects. Furthermore, observation errors, such as an angle error, in particular, may occur if the orientation relative to the road and thus the perspective of the camera and sensor systems toward the road change. This is the case, for example, if the inclination of the road changes during driving (e.g. when driving uphill or downhill). The environment measurement data may therefore be beset by observation errors which, when estimating the course of the road on the basis of the environment measurement data (e.g. according to the procedure shown in FIGS. 1*a* to 1*c*), are transferred to the estimated course of the road, in the present case to the state function 114, for example, to the detriment of accuracy.

For the benefit of safe operation of autonomously driving vehicles, there is therefore a need to provide an improved concept for estimating the road. The concept proposed herein is based on the idea of at least partially compensating for the observation error for the purpose of improving an estimation of the road.

Figure 2:
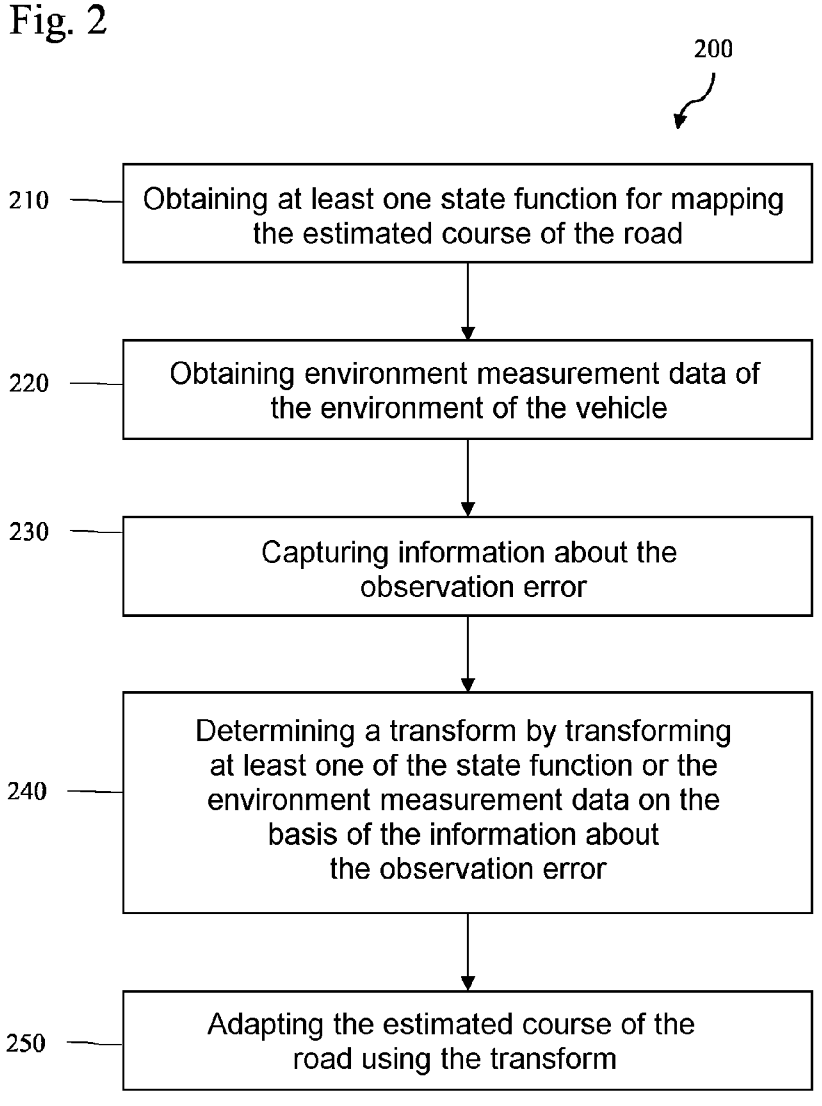
FIG. 2 shows a flow diagram for schematically illustrating an example of a method for at least partially compensating for an observation error when estimating a road course of a road in the environment of a vehicle.

FIG. 2 shows a flow diagram for schematically illustrating an example of a method 200 for at least partially compensating for an observation error when estimating a road course of a road in the environment of a vehicle.

The method 200 comprises obtaining 210 at least one state function for mapping the estimated course of the road. As explained above, the state function comprises one or more functions, for example. For the purpose of obtaining the state function, the latter, as described above, can be generated and/or adapted on the basis of observations of the environments.

Furthermore, the method 200 comprises obtaining 220 environment measurement data of the environment of the vehicle. The environment measurement data comprise for example recordings, image information, sensor data and/or information derived therefrom. In examples, the environment measurement data comprise a function (e.g. a polynomial function) which is approximated to the recordings, image information or sensor data and which maps for example a course of a road boundary or road marking.

In addition, the method 200 comprises capturing 230 information about the observation error. For the purpose of capturing the information about the observation error, in the simplest case it is possible to use predetermined information about the observation error as provided for example by the manufacturer or on the basis of a specification of the respective camera system or sensor system. As explained in greater detail later, for an up-to-date estimation of the observation error, the environment measurement data can optionally be used for capturing the information about the observation error.

Moreover, the method 200 comprises determining 240 a transform by transforming at least one of the state function or the environment measurement data on the basis of the captured information about the observation error for the purpose of at least partially compensating for the observation error. This is done for example by transforming the state function or the environment measurement data in such a way that the observation error is at least partially compensated for. As explained in greater detail later, the observation error can comprise an angle error, and the state function or the environment measurement data can be rotated by the angle error for this purpose. In examples, the transform therefore comprises the transformed state function or the transformed environment measurement data.

As will be understood by a person skilled in the art, optionally both the state function and the environment measurement data can be transformed, for example such that the state function and the environment measurement data each compensate for part of the observation error, for example by virtue of their each being rotated by part of the angle error.

In examples, the state function and the environment measurement data can additionally be converted into a common coordinate system for the benefit of comparability. The state function is converted into a coordinate system of the camera system or sensor system, for example, which may also be referred to as "measurement space". This transformation is effected on the basis of a mathematical specification referred to as "measurement model". In this case, the state function is converted for example from a coordinate system used by the vehicle for control purposes, also referred to as "vehicle coordinate system", into the measurement space by means of the measurement model.

Method 200 additionally comprises adapting 250 the state function using the transform. For the purpose of adapting the estimated course of the road, an approximation method, as explained above, can be carried out, wherein a prediction emerging from the state function is adapted to the observations of the camera system or sensor system. In this case, for example, the state function is approximated to the transformed environment measurement data or the transformed state function is approximated to the environment measurement data. The use of the transform of the state function or of the environment measurement data can yield a more accurate estimation of the course of the road on account of the at least partial compensation of the observation error. In examples, a Kalman filter or some other Bayes filter can be used for adapting the estimated course of the road. In the case where a Kalman filter is used, the state function can be assumed as the state of the Kalman filter and the environment measurement data can be assumed as the observation of the Kalman filter, wherein the state function equal to Xin examples, as above, can be indicated by $$X = \begin{bmatrix} x_0 \\ y_0 \\ \theta_0 \\ c_0 \\ c_{1,1} \\ \vdots \\ c_{1,n} \end{bmatrix}$$

In the case where a Kalman filter is used, the adapting can be effected by way of the so-called "innovation" of the Kalman filter, where a prediction emerging from the state function is compared with the environment measurement data. In this regard, by way of the innovation, the parameters of the state function can be recursively adapted to the environment measurement data (observation data), e.g. camera polynomials describing the road markings.

The course of the road can be estimated analogously by means of other Bayes filters.

The method 200 can be carried out in particular during operation, e.g. while the vehicle is traveling. Accordingly, the method may also be understood as "online bias compensation".

The method 200 will be explained in greater detail below on the basis of a number of concrete examples. It should be pointed out, however, that examples are not restricted to the examples described. Rather, the examples described serve to afford a better understanding of the present disclosure as well as any equivalents of what is described.

FIGS. 3*a*, 3*b*, 3*c* and 3*d* schematically show the proposed concept.

In the scenarios shown, a vehicle 310 controlled in an (partially) automated manner is located on a road 302, for example. In the present case, the vehicle 310 is equipped with a camera system or sensor system for the sensor-aided estimation of the course of the road, for example, and is intended to estimate a road course of the road 302 by means of recordings by way of the camera system or sensor system for the purpose of the (partially) automated control of the vehicle 310.

Figure 3A:
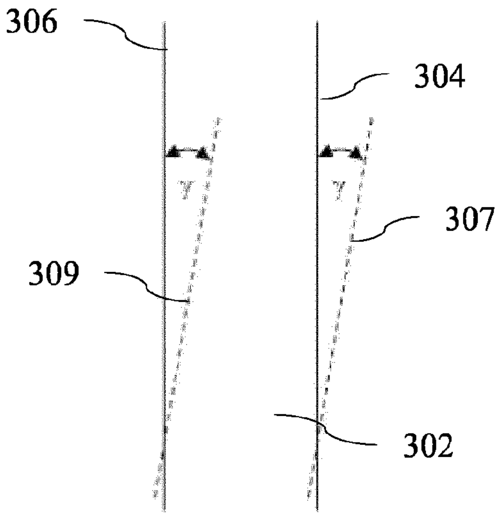
FIGS. 3*a* to 3*e* show the concept of the proposed method.

As shown with reference to FIG. 3*a*, the camera system or sensor system may have a systematic angle error $\gamma$. In the case shown, for example, recordings 307 and 309 of a right road boundary 304 and a left road boundary 306, respectively, may each deviate from the actual course of the road boundaries 304 and 306 of the road 302 by an angle error $\gamma$. In examples, $\gamma$ may be an angle around an origin of a coordinate system of the camera system or sensor system. In the present case, the road 302 is assumed to be straight and level for the sake of simplicity. Accordingly, a left road boundary 306 and a right road boundary 304 of the road 302 run straight and parallel. Straight lines are likewise assumed for the recordings 307 and 309 in the present case, even if the recordings can assume arbitrary courses in examples. It should be noted, however, that the concept described herein is analogously applicable to curved and/or only partly straight road courses.

Figure 3B:
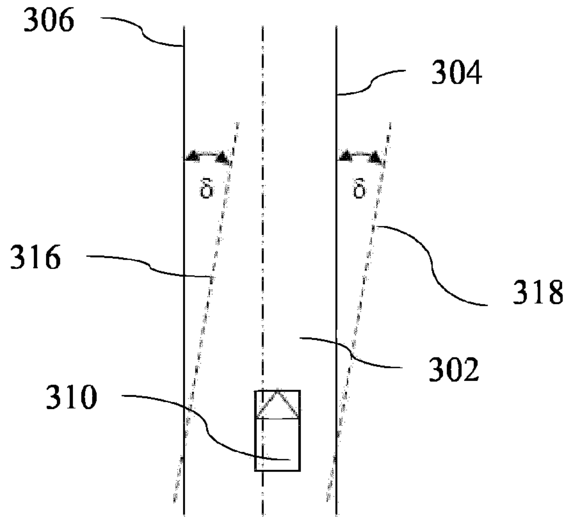

FIG. 3*b* shows a scenario in which the vehicle 310 is situated parallel to the road 302. On the basis of the recordings 307 and 309, the vehicle 310 can generate environment measurement data 316 that map a course of the left road boundary 306, and environment measurement data 318 that map a course of the right road boundary 318. The environment measurement data 316 and 318 comprise or are in each case a polynomial function. In examples, a third degree polynomial function is used, for example. As furthermore shown, on account of the angle error $\gamma$, the environment measurement data 316 and 318 may themselves have an angle error $\delta$ relative to the actual course of the road boundaries 304 and 306. The road course of the road 302 can then be estimated on the basis of the environment measurement data 316 and 318.

Figure 3C:
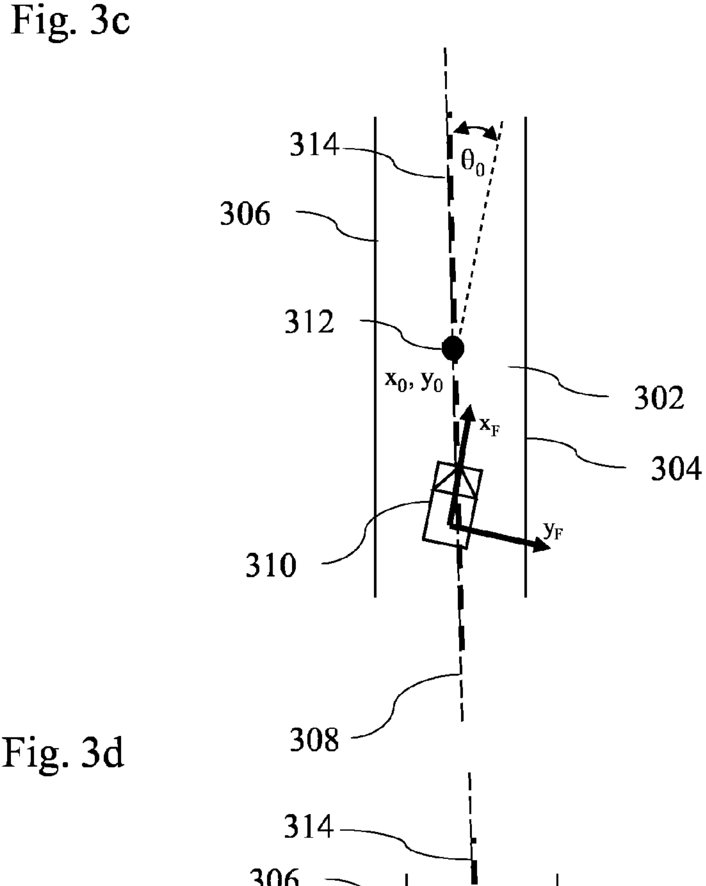

If the camera system or sensor system and the environment measurement data did not have an angle error, then an orientation of the road 302 would be estimated correctly. For the purpose of estimating the road 302, as shown in FIG. 3*c*, it is possible to use a state function 314 (thick dashed line) that maps the estimated course of the road from a predetermined reference point ($x_0$, $y_0$) 312 in the vehicle coordinate system of the vehicle 310 (represented schematically here by $x_F$ and $y_F$). If no angle error were present, the vehicle 310 would adapt an orientation $\theta_0$ (see above) of the state function 314, as shown in the present case, in such a way that the state function 314 runs parallel to an imaginary central line 308 (dash-dotted line) of the road 302. $\theta_0$ indicates for example an angle between the direction of an x-axis ($x_F$) of the vehicle coordinate system and the state function 314. If the vehicle 310, as shown in FIG. 3*c*, is situated obliquely with respect to the road 302, $\theta_6$ may then be not equal to zero.

Figure 3D:
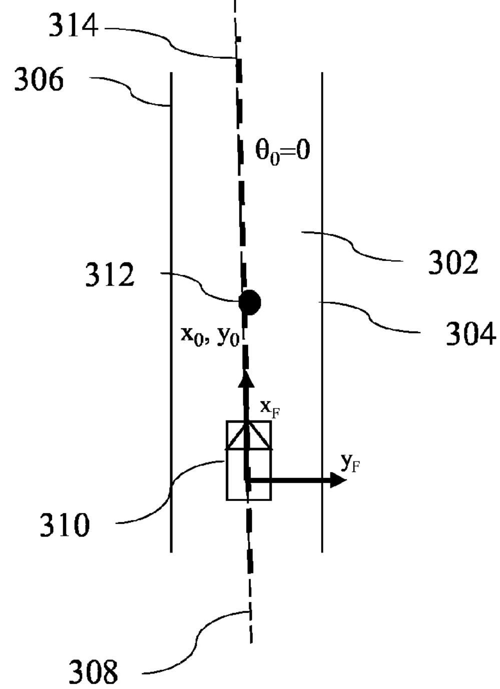

If the vehicle 310, as shown in FIG. 3*d*, is situated parallel to the road 302, $\theta_0$, if no angle error is present, then ideally assumes a value equal to zero.

Figure 3E:
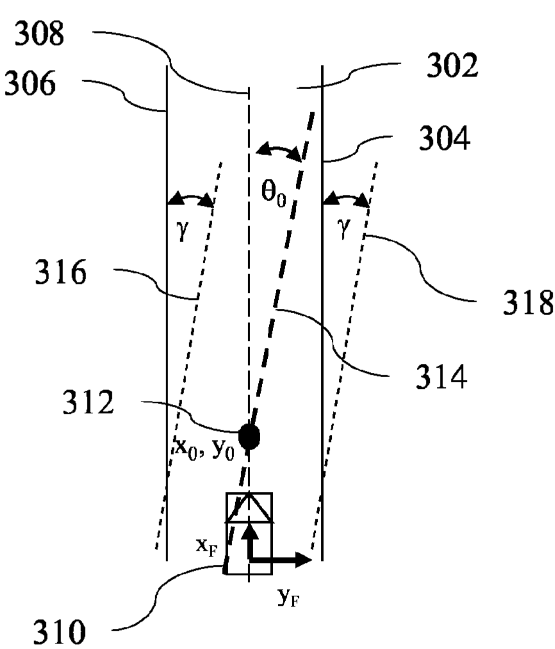

It is often not possible to completely compensate for the angle error before operation of the vehicle, e.g. by calibration of the camera system or sensor system. Accordingly, as shown in FIG. 3*e*, the angle error may be manifested in the estimated course of the road. As shown in FIG. 3*e*, the vehicle 310 may be situated parallel to the road 302, for example, and an angle error of the state function 314 may arise on account of the angle error $\gamma$ and the angle error resulting therefrom in the environment measurement data 316 and 318. In examples, the state function 314 then deviates from the actual course of the road having the imaginary central line 308. In the present case, $\theta_0$ is then not equal to zero, for example, even though the vehicle 310 is situated parallel to the road. In examples, $\theta_0$ can deviate from the actual course of the road by $\delta$ for example in accordance with the environment measurement data. Accordingly, $\theta_0$ can also deviate from the actual course of the road if the vehicle 310 is situated in any other orientation, for example obliquely with respect to the road 302.

In order to at least partially compensate for the angle error $\gamma$, it is proposed to capture information about the angle error $\gamma$ and to transform the environment measurement data 316 and 318 and/or the state function 314 on the basis of the information. It is proposed for example to adapt the orientation $\theta_0$ of the state function 314 or the environment measurement data accordingly on the basis of the information about the angle error. As shown, in this case, the parameter $\theta_0$ can be adapted such that the estimated course of the road (clothoid spline) lies parallel to the observed road boundaries.

For the purpose of capturing 230 the information about the angle error, various procedures can be adopted, as explained below with reference to FIG. 4 and FIG. 5.

Figures 4, 5:
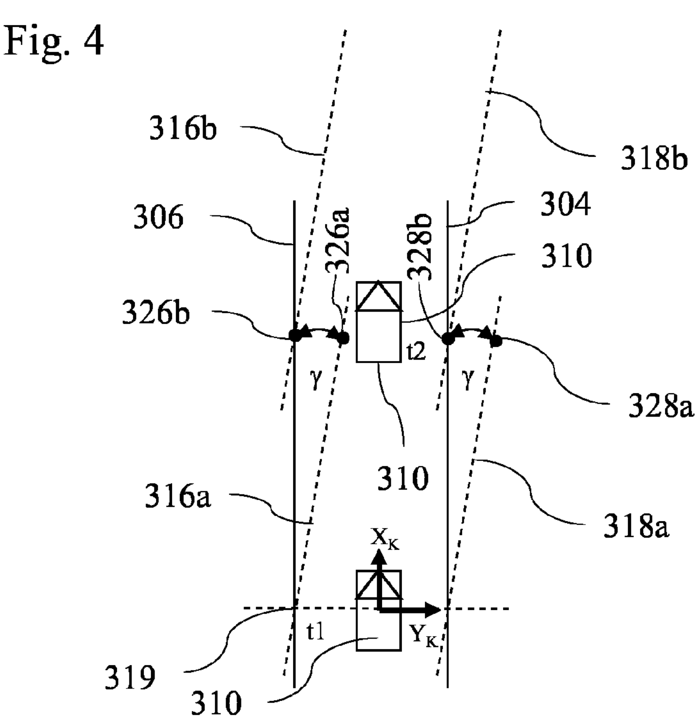
FIG. 4 shows a procedure for determining an angle error.
FIG. 5 shows a further procedure for determining an angle error.

As shown in FIG. 4, in examples, capturing information about the angle error can comprise determining a deviation of the environment measurement data from the course of the road and obtaining the information about the angle error on the basis of the deviation. In this case, in a manner staggered over time, it is possible firstly to measure first environment measurement data 316*a* and 318*a* of the left and right road boundaries 304/306, respectively, at a first point in time t1 and to measure second environment measurement data 316*b* and 318*b* of the respective road boundaries 304/306 at a later, second point in time t2.

As will be understood by a person skilled in the art, the first and second environment measurement data can be converted into a common coordinate system using movement measurement data captured by means of odometry or a locating method, for example.

The information about the angle error can then be determined on the basis of a deviation between the first and second environment measurement data in the common coordinate system.

As indicated in FIG. 4, the deviation for the environment measurement data 316*a* and 316*b* can be implemented on the basis of a deviation of a first measurement point 326*a* of the first environment measurement data 316*a* and a second measurement point 326*b* of the second environment measurement data 316*b*. In order to choose the measurement points 326*a* and 326*b* such that they approximately correspond to the same points in the (real) environment, these can be chosen such that these map the same point in the environment. For this purpose, the measurement points 326*a* and 326*b* can be chosen such that they are at equal distances from the intersection point 319 of a y-axis ($y_K$) of the coordinate system of the camera system or sensor system, represented by $x_K$ and $y_K$, and the environment measurement data 316*a*. The angle error can subsequently be determined on the basis of the deviation of the measurement points 326*a* and 326*b*.

An analogous procedure can be adopted for determining the angle error on the basis of the environment measurement data 318*a* and 318*b* and the measurement points 328*a* and 328*b*. As explained in greater detail later, in some scenarios, it is thereby possible to ascertain different angle errors when capturing the left and right road boundaries.

Alternatively, or additionally, the procedure shown in FIG. 5 can be applied in order to capture the information about the angle error. In this case, movement data can likewise be captured by means of odometry or a locating method and the information about the angle error can be determined on the basis of the environment measurement data and the movement measurement data. As already mentioned above, the angle error $\gamma$ has the effect that the estimated course of the road, in the present case the state function 314, likewise has an angle $\delta$ with respect to the true central line 317. The control of the vehicle 310 substantially follows a control point 332 located at a certain distance in front of the vehicle 310 on the estimated course 314 of the road. Since the estimated course 314 of the road is skew with respect to the true central line, the control point 332 is not located in the center of the road 302. That has the effect that the lateral position of the vehicle 310 has an offset with respect to the true central line 317. This offset depends on the magnitude of the angle error $\gamma$.

Since the angle error $\gamma$ does not change or changes only slowly during operation, the lateral offset caused also remains (almost) constant, i.e. the vehicle travels parallel to the true central line. If a compensating straight line 352 is then placed through positions 341, 342 and 343 of the vehicle 310 which were measured at different times, or at different positions, the direction of the true central line 317 can be determined. The information about the angle error, or the angle error, can accordingly be derived from an angle between the environment measurement data 316 and 318 and the compensating straight line 352.

The information about the angle error can comprise in particular an indication about an error angle of the camera system or sensor system, about an error angle of the environment measurement data or of the state function.

Figure 6:
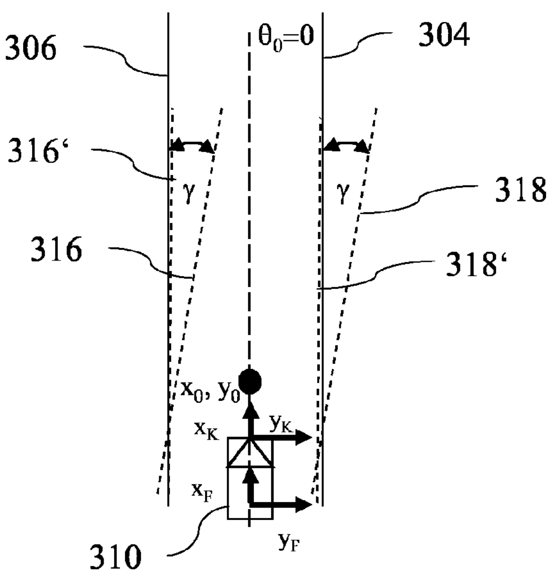
FIG. 6 shows a procedure for at least partially compensating for the angle error.

An at least partial compensation of the angle error can subsequently be performed on the basis of the captured information about the angle error. A procedure provided for this purpose is described in greater detail below with reference to FIG. 6.

As already described above, the environment measurement data 316 and 318 may be beset by the angle error $\gamma$. In this case, $\gamma$ corresponds to an error angle, for example. Specifically, the environment measurement data 316 and 318 may thus deviate from the actual road boundary 304 and 306 by the error angle $\gamma$, for example.

For the purpose of at least partially compensating for the angle error, the environment measurement data 316 and 318 can be transformed in such a way that these are rotated by at least part and ideally completely by the error angle. This can be done in a separate calculation module, for example. The transforms 316' and 318' of the environment measurement data 316 and 318 that are determined in this case then have a smaller deviation from, or a smaller angle relative to, the road boundaries 304 and 306 for the benefit of a more precise estimation of the course of the road. Ideally, the estimated course of the road is then parallel to the actual course of the road.

In an alternative procedure, it is also possible to rotate just the estimated course of the road, i.e. for example the adapted state function, on the basis of the angle error.

In another alternative procedure, it is possible to transform the state function for the purpose of at least partially compensating for the angle error on the basis of the information about the angle error. In examples that provide for using a Bayes filter, such as a Kalman filter, for example, this can be incorporated in a transformation for converting the state function from a coordinate system of the vehicle 310 into the measurement space. In general, the coordinate system of the vehicle 310, described here by $x_F$ and $y_F$, may be different than the measurement space or coordinate system of the camera system or sensor system.

For the proposed procedure, the state function X of the Kalman filter for the road course estimation can be supplemented by an additional parameter for the angle error $\gamma$, such that the state function is indicated by $$X = \begin{bmatrix} x_0 \\ y_0 \\ \theta_0 \\ c_0 \\ c_{1,1} \\ \vdots \\ c_{1,n} \\ \gamma \end{bmatrix}$$

During the transformation of the state function from the state space into the measurement space in the context of the road course estimation, the predicted state function (clothoid spline) is then additionally rotated by the angle error $\gamma$ around the origin of the coordinate system of the camera with the coordinates (x_camera, y_camera). Further or other parameters can optionally be introduced for other observation errors.

If a sampling method is used during the transformation, the rotation can be done by sampled points of the state function with coordinates (x, y)i, where i: running index, being displaced into the camera coordinate system and then being rotated by $\gamma$ around the origin of the coordinate system of the camera. The additional parameter, accordingly $\gamma$ in the present case, can therefore be understood as a rotation parameter. For the purpose of estimating the course of the road, the adapted state function can subsequently be displaced back into the coordinate system of the vehicle 310 again as follows:

1) displacement of the sampled points into the camera coordinate system $$x = x + \text{x\_camera}$$

$$y = y + \text{y\_camera}$$

2) rotation by the angle error $\gamma$ $$x = x \cdot \cos(\gamma) - y \cdot \sin(\gamma)$$

$$y = y \cdot \cos(\gamma) + x \cdot \sin(\gamma)$$

3) displacement back into the vehicle coordinate system $$x = x - \text{x\_camera}$$

$$y = y - \text{y\_camera}$$

The effect of that is as if the "skew" environment measurement data for the left and right road boundaries 304 and 306 were "set straight". As a result of this, with the vehicle straight, the angle $\theta_0$ of the estimated course of the road is also approximately 0 again.

In the case of the concept proposed here, the Bayes filter (Kalman filter) is preferably designed for the benefit of a small fluctuation such that it can quickly adapt the angle $\theta_0$ in order thus to react dynamically to the orientation of the vehicle with respect to the road, but that it can adapt the angle error estimation $\gamma$ only slowly, in particular more slowly than $\theta_0$, in order to compensate for the only slowly changing systematic angle error.

Figure 7A:
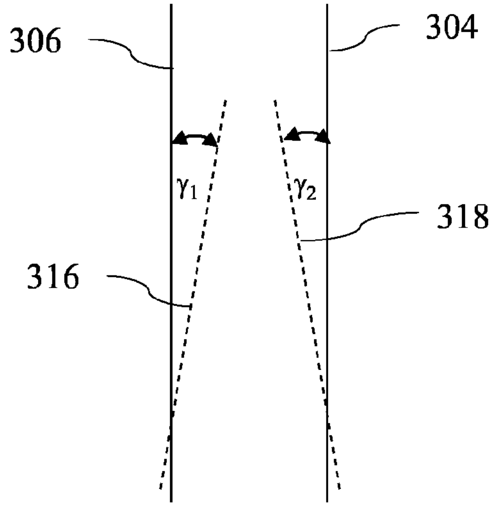
FIGS. 7*a* and 7*b* show a schematic illustration of angle errors in the case of changes in inclination.
Figure 7B:
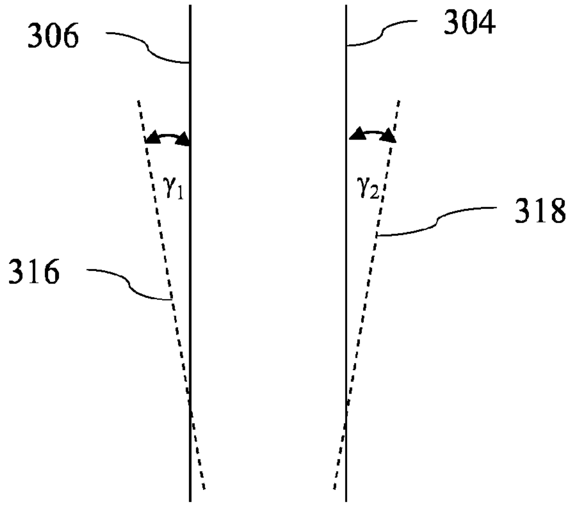

As illustrated in FIGS. 7*a* and 7*b*, the angle error for the left and right road boundaries may generally be different. In particular, the angle error for the right and left road boundaries in different directions may deviate from the actual road boundaries.

As shown in FIG. 7*a*, if the inclination falls, i.e. for example if the vehicle 310 heads toward a declivity, the angle error at the road boundaries 304 and 306 may be such that the associated environment measurement data 316 and 318 run toward one another in the direction of travel. Conversely, as illustrated in FIG. 7*b*, if the inclination rises, i.e. for example if the vehicle 310 heads toward an incline, the environment measurement data 316 and 318 may run away from one another in the direction of travel. Accordingly, the angle errors $\gamma_1$ at the left road boundaries 306 and $\gamma_2$ may be different.

The situations illustrated in FIGS. 7*a* and 7*b* may be interpreted incorrectly as road narrowing or road widening. In the case where angle errors are not equal, an offset of the estimated central line and hence eccentric driving of the vehicle may also occur.

It is therefore proposed to at least partially compensate for the angle error separately for the left and right road boundaries. In particular, this can be effected in examples in which provision is made for mapping the road boundaries separately in each case by means of a respective state function.

For this purpose, it is proposed to capture information about the angle error separately for the left and right road boundaries. Accordingly, it is possible to capture first information about an angle error at the left road boundary and second information about the angle error at the right road boundary.

Accordingly, the angle error can be at least partially compensated for on the basis of the first and second information. For this purpose, the environment measurement data can be transformed in each case on the basis of the information about the angle error at the respective road boundary. For example, the environment measurement data 316 can be rotated by $\gamma_1$ and the environment measurement data 318 can be rotated by $\gamma_2$. Optionally, analogously to the description above, the state function can be transformed, or rotated, on the basis of the first and second information for the purpose of at least partial compensation. In cases that provide separate state functions for the left and right road boundaries, the state functions can be transformed on the basis of the respective information about the angle error. A state function for mapping the left road boundary 306 can accordingly be rotated by $\gamma_1$, for example. The corresponding state function of the right road boundary can accordingly be rotated by $\gamma_2$.

By virtue of the compensation of these angle errors that arise (on account of changes in inclination, e.g. when driving uphill and downhill) in the observation data by means of the methods described above, the course of the road is estimated more accurately and negative effects on the automated control are avoided or at least partially reduced.

As explained, the error angles $\gamma_1$ and $\gamma_2$ may depend in particular on the inclination of the road. Accordingly, it is proposed, in examples, to determine information about the angle errors $\gamma_1$ and $\gamma_2$ on the basis of information about changes in the inclination of the road. For example, map data of the environment and/or height information about a height of the vehicle 310 can be used for capturing the information about changes in inclination. In this regard, for example, $\gamma_1$ and $\gamma_2$ can be determined on the basis of the information about changes in inclination.

It should be noted that the procedure described herein for determining/ascertaining and/or compensating for the angle error can be analogously applied to other observation errors. In this regard, for example, curvature errors and/or offset errors that may be based on optical errors can be analogously ascertained and/or at least partially compensated for. In particular, in applications, in addition or as an alternative to the angle error, curvature and/or offset errors can be at least partially compensated for.

Moreover, it should be noted that although the proposed concept in the present case has been described on the basis of examples with straight road courses, the concept can also be analogously applied to curved road courses. Furthermore, it should be pointed out that the concept described herein can be applied generally to any vehicles and traffic areas and in connection with any methods for estimating the course of a road that fall within the scope of the claimed concept.

Besides systematic errors of the environment measurement data (observation data) and erroneous environment measurement data of the camera system or sensor system, it may also happen that the sensors supply no or deficient environment measurement data of the surroundings.

Brief absence of the environment measurement data can be compensated for when estimating the course of the road, e.g. by means of the Kalman filter. If at most a predetermined amount of environment measurement data is absent, then the Kalman filter outputs a course of the road that was estimated in the preceding time step and has been corrected by a movement of the vehicle (prediction).

However, if no new environment measurement data are available for a relatively long time, it is assumed that this predicted course of the road no longer matches the real course of the road.

In this case, the vehicle is then no longer controlled on the basis of the predicted course of the road. It is proposed here to monitor whether new environment measurement data of the sensor system or camera system arrive and are processed. If no more new observation data have been processed for a predetermined time period t, the road estimation is switched off in order that an erroneous or excessively deficient road estimation is not used for the automated control. By way of example, a driver of the vehicle is then requested to take over the control of the vehicle.

Moreover, the Kalman filter can ascertain an uncertainty of the road estimation in successive time steps. This uncertainty increases as the vehicle moves. The uncertainty would be reduced again by way of the processing of environment measurement data. Since the uncertainty is not reduced if observation data fail to appear, the uncertainty increases if observation data fail to appear. Therefore, besides the monitoring over time, a level of the uncertainty of the road estimation is also monitored and the road estimation is likewise switched off if a limit is exceeded.

Specifically, by means of a transformation from the state function, the uncertainty between vehicle and estimated road boundary is calculated and the road estimation is switched off in the event of a level being exceeded.

Furthermore, it may happen that although the camera system or sensor system supplies environment measurement data, these data have an insufficient quality, for example when snow is falling, there is heavy rain, fog or a dirty road. In some instances, the sensors themselves can ascertain the quality of the environment measurement data generated by them. For this purpose, besides the environment measurement data, the camera system or sensor system additionally supplies quality values, such as, for example, an indication about a probability of the existence of a road marking or a recursively estimated standard deviation of a geometry of the road marking.

Accordingly, it is proposed to assign quality measures to the environment measurement data and, in the case of environment measurement data with insufficient quality measures, e.g. if the latter fall below a limit value, not to use the environment data, in particular not to use them for estimating the course of the road.

If the camera system or sensor system does not supply quality measures, quality measures can optionally be ascertained separately.

The quality measures may also need to be filtered before comparison with a limit value.

In accordance with a further aspect, a probability of the existence of the environment measurement data can be monitored, and if it lies below a certain threshold, the environment measurement data are not used for the estimation of the course of the road. Moreover, a large fluctuation of the probability of existence may indicate bad observation data.

In the area of roadworks, it happens that a changed road course is indicated by a special marking. Sometimes, however, this special marking cannot be differentiated from a customary marking outside the roadworks by the camera system or sensor system. It may happen that the camera system or sensor system therefore supplies a plurality of alternative environment measurement data.

If the environment measurement data both of the special marking and of the customary markings outside the roadworks are used for estimating the road, this results in an incorrect estimated course of the road. Therefore, provision is made for using only one of the alternative observation data if the special marking cannot be differentiated from the customary marking outside the roadworks by the camera system or sensor system. In particular, the alternative that involves the least difference between predicted course of the road and observation data is selected. The calculation of the difference can comprise e.g. the calculation of a Mahalanobis distance.

Figure 8:
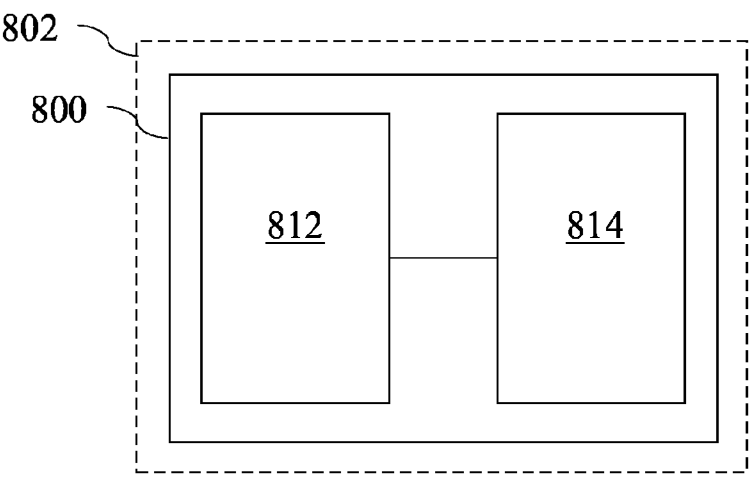
FIG. 8 shows an apparatus according to the proposed concept.

The concept proposed in the present case can also be implemented in an apparatus 800 (for a vehicle 802), as shown in FIG. 8.

The apparatus 800 comprises one or more interfaces for communication 812 and a data processing circuit 814 designed to control the one or more interfaces 812 and to carry out an example of the method described herein using the one or more interfaces 812.

The one or more interfaces 812 are connected to the data processing circuit 814 and can comprise in particular one or more interfaces to a camera system or sensor system of the vehicle 802 in order to capture environment measurement data of an environment of the vehicle 802 by means of the camera system or sensor system in accordance with the method. Furthermore, the one or more interfaces 812 can also comprise one or more interfaces to a control device of the vehicle 802 in order to provide the control device with the course of the road that has been estimated in accordance with the method for the purpose of the (partially) automated control of the vehicle or for the purpose of indicating the course of the road for an occupant. In examples, the one or more interfaces 812 can comprise contacts (referred to as: "pins"), transmitting and receiving components and/or further means for information transfer.

In examples, the data processing circuit 814 can comprise any means for electronic information processing, for example a microcontroller, a processor (core), a graphics processor and/or the like. The data processing circuit 814 can be configured by means of software and/or hardware components to implement the concept proposed herein, in particular in order to carry out steps of the information or data processing for implementing this concept. In particular, the proposed concept can be implemented in a computer program comprising instructions which, when the program is executed by the data processing circuit 814, cause the latter to carry out the method proposed herein.

It should be noted that explanations concerning the method described herein apply equally to the apparatus described.

Functions of various elements shown in the figures, and also the function blocks designated, can be implemented in the form of dedicated hardware, e.g. "a signal provider", "a signal processing unit", "a processor", "a controller", etc., and as hardware capable of executing software in conjunction with associated software. When provided by a processor, the functions can be provided by a single dedicated processor, by a single jointly used processor or by a plurality of individual processors, some or all of which can be used jointly. However, the term "processor" or "controller" is on no account limited to hardware exclusively capable of executing software, but rather can encompass digital signal processor hardware (DSP hardware), network processor, application specific integrated circuit (ASIC), field programmable gate array (FPGA), read only memory (ROM) for storing software, random access memory (RAM) and non-volatile storage device. Other hardware, conventional and/or customized, can also be included.

A block diagram can represent a rough circuit diagram, for example, which implements the principles of the disclosure. In a similar manner, a flow diagram, a flow chart, a state transition diagram, a pseudo-code and the like can represent various processes, operations or steps which for example are substantially represented in a non-transitory computer-readable medium and thus executed by a computer or processor, regardless of whether such a computer or processor is explicitly shown. Methods disclosed in the description or in the patent claims can be implemented by a component which has a means for performing each of the respective steps of these methods.

It goes without saying that the disclosure of a plurality of steps, processes, operations or functions disclosed in the description or in the claims should not be interpreted as being in the specific order, unless this is explicitly or implicitly indicated otherwise, for example for technical reasons. The disclosure of a plurality of steps or functions therefore does not limit them to a specific order unless said steps or functions are not interchangeable for technical reasons. Furthermore, in some examples, an individual step, function, process or operation can include a plurality of partial steps, partial functions, partial processes or partial operations and/or be subdivided into them. Such partial steps can be included and can be part of the disclosure of said individual step, provided that they are not explicitly excluded.

Although some aspects have been described in the context of an apparatus, it is clear that these aspects also represent a description of the corresponding method, where a block or an apparatus corresponds to a method step or a function of a method step. Analogously to this, aspects described in the context of a method step also represent a description of a corresponding block or element or property of a corresponding apparatus.

LIST OF REFERENCE SIGNS

101 roadway
102 lanes
103 road boundaries
110 vehicle
112 reference point
113 transition points
114 state function
114' polynomial
122 sample points
132 environment measurement data
142 sample points
191-*n* segments
200 method for estimating the course of a road
210 obtaining a state function
220 obtaining environment measurement data
230 capturing information about an observation error
240 determining a transform
250 adapting the estimated course of the road
302 road
304 right road boundary
306 left road boundary
308 center of road
310 vehicle
312 reference point
314 state function
316 environment measurement data
316' transform of the environment measurement data
316*a* environment measurement data
316*b* environment measurement data
318 environment measurement data
318' transform of the environment measurement data
318*a* environment measurement data
318*b* environment measurement data
332 control point
341 position
342 position
343 position
352 compensating straight line
800 apparatus
802 vehicle
812 one or more interfaces
814 data processing circuit

What is claimed is:

1. A method for at least partially automated operation of a vehicle in accordance with an estimated course of a road in an environment of the vehicle, the method comprising:
- obtaining a state function that maps the estimated course of the road;
- generating environment measurement data from a sensor system of the vehicle, wherein the environment measurement data erroneously maps an observed course of the road due to an observation error included in the environment measurement data;
- capturing information about the observation error;
- determining a transform by transforming the state function or the environment measurement data based on the captured information to compensate for the observation error; and
- adapting the estimated course of the road using the transform such that the at least partially automated operation of the vehicle is in accordance with the adapted estimated course of the road.

2. The method of claim 1, wherein the capturing information about the observation error comprises:
- determining a deviation of the environment measurement data from the course of the road; and
- obtaining the information about the observation error based on the deviation.

3. The method of claim 1, wherein
- the information about the observation error comprises an error angle, and the determining the transform comprises:

rotating the state function or the environment measurement data based on the error angle.

4. The method of claim 3, wherein the rotating comprises:

rotating using a Bayes filter for estimating the course of the road, wherein a rotation parameter of the Bayes filter is based on the error angle.

5. The method of claim 1, wherein the capturing information about the observation error comprises:

capturing movement measurement data of the vehicle; and determining the information about the observation error based on the environment measurement data and the movement measurement data.

6. The method of claim 5, wherein the environment measurement data comprises first environment measurement data measured at a first point in time and second environment measurement data measured at a later second point in time, and the determining the information about the observation error comprises:

transforming the first and second environment measurement data into a common coordinate system using the movement measurement data; and determining the information about the observation error based on a deviation between the first and second environment measurement data in the common coordinate system.

7. The method of claim 6, wherein the determining the deviation between the first and second environment measurement data comprises:

determining the deviation based on a deviation of a first measurement point of the first environment measurement data and a second measurement point of the second environment measurement data, wherein the first and second measurement points map the same point in the environment.

8. The method of claim 1, wherein the capturing the information about the observation error comprises:

capturing first information about an observation error at a left road boundary and second information about the observation error at a right road boundary; and the determining a transform comprises:

determining a transform by transforming the environment measurement data and/or the state function to compensate for the observation error at the left road boundary based on the first and second information.

9. The method of claim 8, wherein the capturing the first and second information comprises:

obtaining information about changes in inclination of the road; and determining the first and second information based on the information about changes in the inclination of the road.

10. A non-transitory computer-readable medium comprising instructions operable, when executed by one or more computing systems, to configure the one or more computing systems to:

obtain a state function that maps an estimated course of a road in an environment of a vehicle configured to operate in an at least partially automated manner in accordance with the estimated course of the road;

generate environment measurement data from a sensor system of the vehicle, wherein the environment measurement data erroneously maps an observed course of the road due to an observation error included in the environment measurement data;

capture information about the observation error;

determine a transform by transforming the state function or the environment measurement data based on the captured information to compensate for the observation error; and adapt the estimated course of the road using the transform such that the at least partially automated operation of the vehicle is in accordance with the adapted estimated course of the road.

11. An apparatus, comprising:

one or more interfaces for communication; and a processor configured to:

control the one or more interfaces;

obtain a state function that maps an estimated course of a road in an environment of a vehicle configured to operate in an at least partially automated manner in accordance with the estimated course of the road;

generate environment measurement data from a sensor system of the vehicle, wherein the environment measurement data erroneously maps an observed course of the road due to an observation error included in the environment measurement data;

capture information about the observation error;

determine a transform by transforming the state function or the environment measurement data based on the captured information to compensate for the observation error; and adapt the estimated course of the road using the transform such that at least partially automated operation of the vehicle is in accordance with the adapted estimated course of the road.

12. The apparatus of claim 11, wherein the apparatus is a vehicle.

* * * * *